March 26, 1963   J. C. SHARP ETAL   3,083,081
FERTILIZER GRANULATING DRUM UNIT
Filed March 10, 1961   2 Sheets-Sheet 1

INVENTORS
Joe C. Sharp
Wilbur A. McPherson
BY

March 26, 1963     J. C. SHARP ETAL     3,083,081
FERTILIZER GRANULATING DRUM UNIT Filed March 10, 1961     2 Sheets-Sheet 2

INVENTORS
Joe C. Sharp
Wilbur A. McPherson
BY *Leroy G. Linn*

3,083,081
FERTILIZER GRANULATING DRUM UNIT
Joe C. Sharp, Kansas City, Mo., and Wilbur A. McPherson, Baxter Springs, Kans., assignors to Spencer Chemical Company, a corporation of Missouri
Filed Mar. 10, 1961, Ser. No. 94,919
11 Claims. (Cl. 23—259.1)

This invention relates to apparatuses for the granulation of fertilizers. More particularly, it relates to a rotating drum-type of granulator adaptable to the preferred continuous commercial operations.

In the production of many mixed fertilizer compositions presently offered for commercial use, granulation steps are incorporated into the various production processes. Especially is this true in those fertilizers containing a substantial amount of available nitrogen. It is the custom within the industry presently to introduce the available nitrogen to a solid fertilizer component containing such solids as superphosphate and potassium chloride within a rotating drum-type of granulator. The nitrogen is introduced in such forms capable of providing in situ salt formation, as either liquid or gaseous anhydrous ammonia, aqueous ammonia solutions, and aqueous solutions of ammonia containing certain other nitrogen-containing compounds such as ammonium nitrate or urea. At times non-nitrogen containing fluids such as water or acids, for example, sulfuric or phosphoric acids, can be added supplementarily or alternatively to the solids in order to provide the desired analysis and to provide sufficient fluid for granulation of the fertilizer.

Presently there is a widespread use within the industry of a continuous type of rotating granulator of the general type described by Francis T. Neilson in U.S. Patent No. 2,741,545. By its use, a highly expedient and economical manner of producing granulated fertilizer has been provided. However, there have been certain attendant difficulties experienced in its operation. One difficulty has been the lack of desired uniformity of the size of the granulation provided by its operation. It is highly desired in commercial fertilizers that the size of the end product granules be essentially free of "oversize," i.e., granules that fail to pass at least a 6-mesh screen. Likewise, the desired end product will be low, or preferably substantially free, of "fines," i.e., particles that are too small to be retained by a 20-mesh screen. In fact, it is highly desired that nearly all of the granulations are within the narrower range of 6-mesh to about 14-mesh.

As to fines, if there is a significant quantity present, it is required in production of quality fertilizer that they be removed and be re-fed to the granulator for build-up to an acceptable size. In respect to excessive oversize, it likewise is removed and reduced in size as by grinding or crushing before incorporation into the product. It is readily apparent that where there is a large amount of these extremes in granule sizes, such lack of uniformity does not lend to the overall end goal of homogeneity of the finally bagged and shipped product.

A further difficulty experienced by the use of these rotary drum-type granulators is the caking of the wetted fertilizer mass, or the granulation bed, to the walls of the granulator as the drum slowly turns effecting the granulation. As the granulation continues, the cake or fertilizer coat on the interior of the drum attains greater and greater thickness (unless this unwanted action is abated or prevented), making necessary interruption of the continuous process to remove by hammering or chipping the interfering cake from the interior.

Various means have been proposed to cope with this noxious build-up of fertilizer on the interior drum surfaces. For example, it has been proposed that scrapers be installed along the length of the interior wall to prevent caking beyond a set tolerance. It has been proposed that there be compartments within the wall of the granulating drum containing vascillating steel balls that would cause an abrupt thrust upon the drum at a certain point in the rotation. It has further been proposed that there be affixed to the exterior of the drum hinged mechanisms termed "shell knockers" which at certain points in the rotation fall forward causing a hammering action thereby striving to jar loose the inner accumulation, as shown in U.S. Patent No. 2,885,278 by E. N. Mortenson. It will be readily appreciated that associated with these previous mechanisms are shortcomings, including inefficient anti-caking action, high power consumption, an undesired enhancement of noise levels in the commercial fertilizer plants to the discomfort of plant operators, or the like.

An object of this invention is to provide an improved fertilizer granulating drum unit adaptable to a continuous granulating process. A further object of this invention is to provide a granulating drum unit by which troublesome caking on the interior wall of the granulator can be avoided. Another object is to provide such a granulating drum unit which will enable product of homogeneous granulations having low content of "oversize" and "fine" granules. Other objects of this invention will become apparent to those skilled in the art from the drawings and the description herein set forth.

Accordingly, broadly speaking, there is provided by this invention an improved granulating drum unit amenable to continuous operations which comprises in combination an open-end, rotatable, granulating drum, two retaining rings singly disposed at the respective annular ends of the granulating drum to prevent premature outflow of the granulating mixture, a drum-cleaning rotor of substantially the length of the granulating drum unit and having radially projecting longitudinal ribs at regularly spaced intervals, and supporting means for rotatably carrying the drum-cleaning rotor in predetermined position with the axis of said drum-cleaning rotor substantially parallel to the axis of the granulating drum unit and in contact with the interior surface of the granulating drum unit. The drums preferably have on their interior surfaces radially projecting, longitudinal ribs at regularly spaced intervals. Further, the drum units also preferably have a second rotor of the above description which rotates within the granulating bed and which is herein denominated a "kneading" rotor.

The drum units of this invention can be and are frequently preferably employed in end-to-end series of two; the first unit can be a reaction compartment such as an ammoniating zone with the second compartment offering greater granulating areas and periods whereby more rounded, more uniform granules are produced.

This invention will be more readily understood from a reading of the following specification and by reference to the accompanying drawings wherein a preferred double-unit embodiment of the granulating drum unit provided by this invention, having both a cleaning and a kneading rotor as well as longitudinal ribs in each of the units in series, is shown and wherein.

Figure 1:
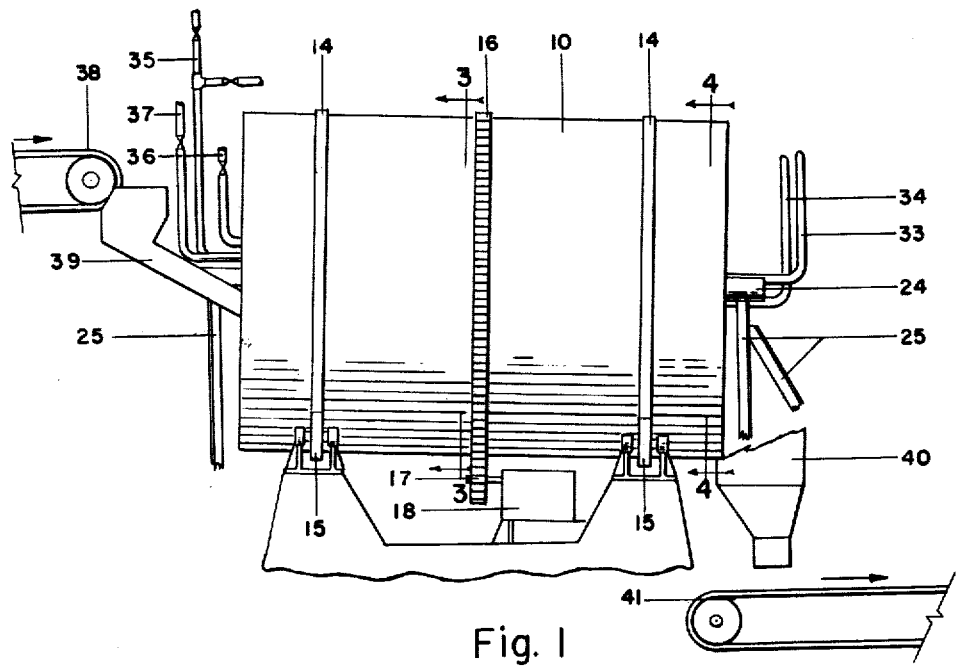
FIG. 1 is a side view of the granulator assembly.
Figures 3, 4:
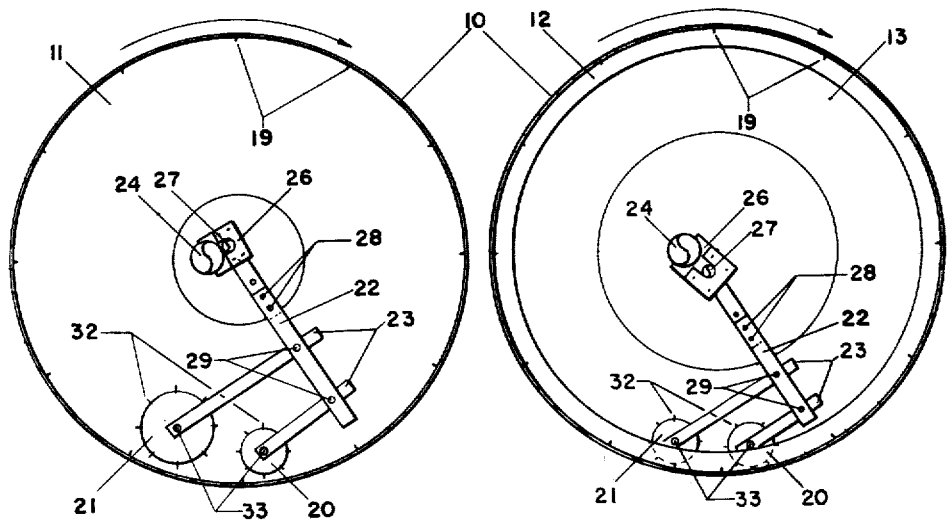
FIG. 3 is a vertical cross sectional view of the feed end unit taken along line 3—3 of FIG. 1, which passes through the space separating the ends of the rotors of the unit from the ring dividing the two units, omitting certain portions for clarity.
FIG. 4 is a vertical cross section of the discharge end unit of the granulator taken at line 4—4 of FIG. 1, which passes through the drum at the discharge side of the discharge end retaining ring.
Figure 2:
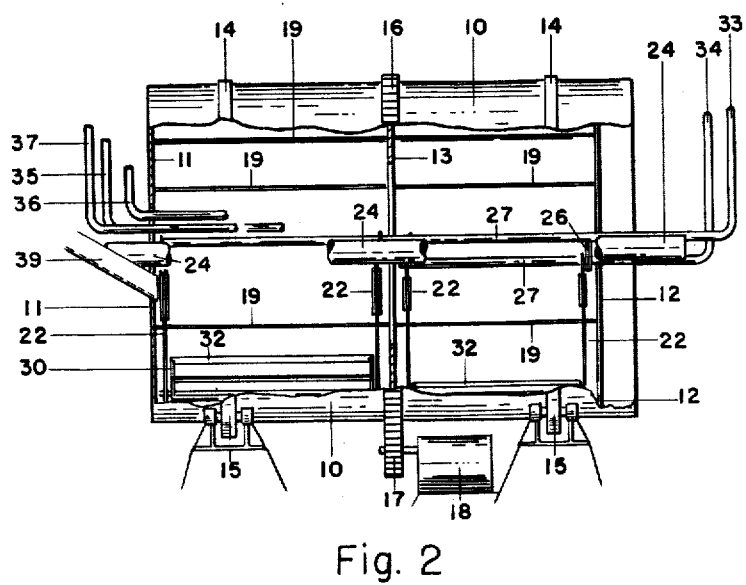
FIG. 2 is a view of the granulator of FIG. 1 showing the drum and other portions partially cut away and showing a vertical cross section of the two end retaining rings and the dividing ring of the granulator, the cross section of the rings running through the longitudinal axis of the drum.
Figure 5:
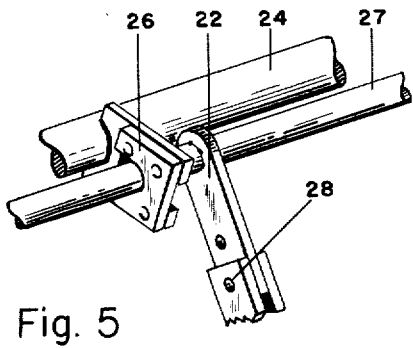
FIG. 5 is a perspective view of a section showing in detail the manner of attachment of a rotor supporting frame to the axis of the granulator drum.

Referring to the drawings, the numeral 10 designates a granulating drum having open ends. The drum 10 has retaining rings 11 and 12 at the feed end and discharge end, respectively. The drum is divided into two units by dividing ring 13. The drum 10 is fitted with tires 14 on which the drum is mounted on trunnions 15. Encircling the drum 10 is attached spur gear 16, which is driven by driving gear 17 through a power motor 18. Affixed as by welding, bolts, or the like, to the interior sides of the drum 10 in a longitudinal direction are metal ribs 19 projecting radially from the surface of the drum and extending the entire length of the drum units. The ribs 19 can be constructed of metal bars or other suitably shaped stock. The ribs 19 are located at spaced intervals and should not be of an excessive height which will disrupt the existence of a fertilizer bed in a lower quadrant of the drum. Thus, the ribs 19 should be of a height and shape that will not carry the entire granulation mixture to the top of the drum as is expected of the usual flight mechanisms. It has been found that ribs 19 of a height of about three-quarters inch to one and one-half inches are usually sufficient to provide the desired rolling action in the granulation bed but yet to permit existence of a stable bed in a lower drum location. Furthermore, the ribs 19 should not be of an excessive height so as to interfere with the contact of the rib members of the rotors with the interior surface of the drum.

The cleaning rotors 20 and the kneading rotors 21 are held in position in drum 10 by supporting frames consisting of supporting frame members 22 and communicating supporting frame members 23. The supporting frames depend pivotally from the drum axis 24. The drum axis 24 is constructed of a metal pipe supported by frame 25. Attached to the drum axis 24 as by welding are support brackets 26, to which are pivotally attached through shafts 27 the rotor supporting frame members 22. The supporting frame members 22 are affixed to shafts 27 by welding. The supporting frame members can be adjusted in length by removing pins 28, shortening or lengthening the supporting frame members and replacing the pins 28 in matched holes. Affixed in turn through pins 29 with the supporting frame members 22 are the communicating supporting frame members 23. The communicating supporting frame members 23 rotatably support cleaning rotors 20 and kneading rotors 21 in a predetermined spaced relation so as to provide contact of the rotors with the interior walls of the drum.

Figure 6:
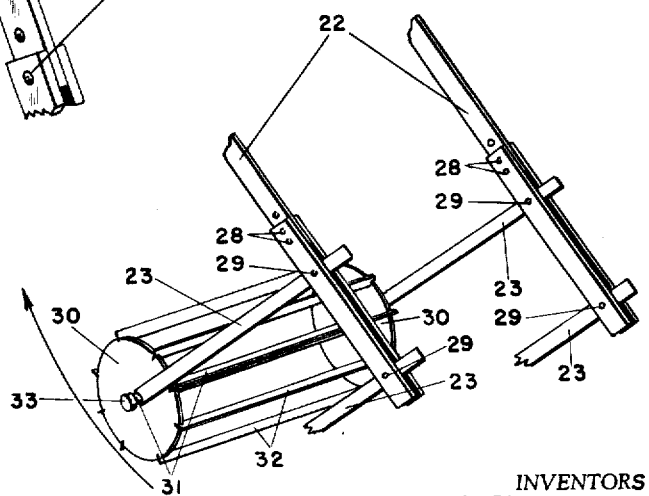
FIG. 6 is a perspective view showing in detail a section of the assembly of the rotors of a unit to their supporting frame. (Only the kneading rotor is shown in place, the cleaning rotor having been cut away for clarity.)

The rotors are comprised of circular end plate members 30, shafts 31, which are attached in fixed relation as by welding to the end plate members 30, and radially projecting longitudinal ribs 32 attached at spaced intervals to the end plate members 30 by fitting into the slots of the end plate members 30 and are attached thereto as by welding or by attachment with bolts or rivets. The rotors 20 and 21 are held in a fixed rotatable position to shafts 31 by caps 33 attached to the respective ends of shafts 31. The ribs 32 can be made of metal bar stock to provide ribs projecting suitably one-half inch to two, or more inches if desired. The ribs 32 of the rotors should be at least the height of the ribs 19 of drum 10 for best results. It is preferred that rotors be open cylinders such as described in FIG. 6, rather than having a closed cylinder surface underlying the ribs 32. The cleaning rotor 20 can vary in size but suitably can be under most conditions from six to eight inches in diameter. The kneading rotors can vary in size also but suitably can be under most conventional operating conditions from about eight to about twenty inches in diameter. The rotors should for best results extend substantially the full length of their respective granulating unit.

The shafts 27 of the supporting frames are rotatable through levers 33 and 34 affixed to the respective ends of shafts 27 (which extend beyond the discharge end of the granulator drum 10) so as to permit a clockwise or counter-clockwise adjustment in the positions of the rotors either in the direction of or away from the granulating bed as needed or desired. Through lever 33 the position of the rotors of the feed end unit is adjustable, and through lever 34 the position of the rotors of the discharge end unit is adjustable. The levers are held in place by use of conventional lever locking means. Both rotors of each unit may have their individual supporting frames in which individual adjusting levers can be provided to regulate individually the location of all the rotors rather than in a unitary manner as shown. Conventional means of introducing ammonia, acids, or water are provided as represented by supply lines 35, 36, and 37, respectively, which communicate respectively with supplies of each (not shown). The lines enter the granulator and feed into the granulation bed in conventional manners, which are not shown since they are not an integral portion of this invention.

In operation the solid fertilizer materials such as superphosphate, potassium chloride, and the like, are introduced into the feed end unit of the granulator as a mixture by conveyor 38 through the feed chute 39 at the desired rate by regulating the rate of the conveyor. The drum 10 is rotated counter-clockwise as viewed from the feed end at a rate so as to maintain the granulating bed in a position largely in the forward lower quadrant of the drum bounded by the vertical and the horizontal planes through the drum axis 24. This can ordinarily be accomplished by rotating the drum at a controlled rate, a peripheral drum speed rate in the range of about one hundred to two hundred feet per minute being generally suitable. The fertilizer solids are treated as desired, e.g., with an ammoniating solution, acids, and/or water, in conventional manners. As solids are continually introduced into the feed end granulating unit, the granulation bed moves in the direction of the discharge end as the drum rotates. When the granulation bed becomes of sufficient depth in the feed end unit, the granulation bed will spill over the dividing ring 13 into the discharge end granulating unit. The granulation bed finally spills over the discharge end retaining ring 12, out of the end of the drum, and into the discharge chute 40 to conveyor 41. The conveyor transports the granulated fertilizer on for further processing such as drying, cooling, screening, and the like within normal practice.

A continuous operation is exemplified by the figures. The drum has an incline of slight proportions. Customarily, an incline of about one to two inches will suffice depending on the height of the rings, the length of the granulator drum, the speed of drum rotation, and the like.

As the granulating bed passes along toward the discharge end by the rotation of the drum, the cleaning rotors 20 and the kneading rotors 21 also turn or rotate in the direction opposite to the drum rotational direction by their contact with the interior surfaces of the drum, thereby providing their designed purposes. The kneading rotors are regulated in position so as to be submerged at least in part in the granulating bed, usually in a lower segment thereof. The position of the cleaning rotors will be behind the granulating bed to enable them to perform their cleaning actions.

The following are descriptions of illustrative granulation runs employing the rotatable drum granulation units of this invention. It is to be understood, of course, that modifications and alternative constructions other than specifically described herein, as in the drawings and the descriptions of the illustrative runs, will be suggested to those skilled in the art. It is the intent by the appended claims to include all such variations which fall within the spirit and scope of this invention.

A 5-20-20 (percent N-percent $P_2O_5$-percent $K_2O$, by weight) granular fertilizer was prepared employing an open-end, drum-type granulator of pilot plant size. The granulator drum is equipped with retaining rings, the retaining ring at the feed end having a height of about ten inches and the retaining ring at the discharge end having a height of four inches. The granulator is divided into two compartments by a dividing ring having a height of about eight inches, the first compartment being an ammoniating compartment with a length of about fifteen inches, and the second compartment being the granulating compartment having a length of about forty-five inches. The drum has a total length of about five feet and has a total horizontal slope of about one inch from the feed end to the discharge end. The diameter of the drum is about twenty-nine inches. The ammoniating compartment is equipped in the conventional manner.

The granulating compartment was equipped with a rotor made of steel pipe having a diameter of six inches and a length extending substantially the length of the granulating compartment. The rotor has six longitudinal ribs projecting radially from the surface of the pipe one and one-half inches in height and extending the length of the rotor. The ribs were formed by welding sections of a one and one-half inch by one-fourth inch steel bar stock to the rotor. The ends of the steel pipe were closed by welding six-inch circular plates of one-fourth inch thickness to the respective ends of the pipe. The plates had one-half inch centrally disposed holes for insertion of a shaft through the rotor. The rotor was carried then rotatably by a steel frame depending from the axis of the granulating drum in a set position in contact with the interior surface of the drum parallel to the axis of the drum and about six inches behind the granulating bed. Seven ribs were installed in the granulating compartment extending radially from the inner surface of the granulating drum. The ribs ran the full length of the compartment and had a height of one inch and a thickness of one-fourth inch. The ribs were installed in a position parallel to the axis of the drum at regularly spaced intervals.

The granulator was rotated at about twenty revolutions per minute. The following solid fertilizer components were fed in admixture by a feed chute into the ammoniating compartment at a rate of about 255 pounds per hour. The finely divided solid fertilizer mixture fed had the following composition.

| Component: | Lbs./ton final product |
|---|---|
| Superphosphate (20% $P_2O_5$) | 446 |
| Potassium chloride | 667 |
| Superphosphate (45% $P_2O_5$) | 690 |

The ammoniating solution employed in the granulation was fed through the ammonia distributor at a rate of about thirty pounds per hour and had the following composition: anhydrous ammonia solution 20.2%; ammonium nitrate 72.3%; and water 7.5% (all by weight). The total nitrogen percent of the ammoniating solution was 41.4 percent.

The granulating compartment remained substantially free of any caking throughout the run, in contrast to experience when a conventional unit is employed in the preparation.

Additionally, it was observed by screen analyses that a substantial improvement in quantity of acceptable granule size for commercial use (6 to 20-mesh) was obtained when the granulator was constructed in accordance with this invention, as above described. A controlled run was made without the ribs and rotor installations for comparison. Samples were taken as the granules were discharged from the granulator and were dried. The results of the analyses are set out in the following table:

*Table I*

| Run [1] | Percent by Weight of Granule Sizes [2] | | |
|---|---|---|---|
| | −20 Mesh | 6 to 20 Mesh | +6 Mesh |
| A | 9.6 | 69.7 | 20.6 |
| B | 30.3 | 38.4 | 31.4 |

[1] "A" Run—the granulator of this invention employed; "B" Run—conventional granulator employed.
[2] Each value given represents an average of five samples screened. The designations "−20 Mesh" means smaller than 20 Mesh size and "+6 Mesh" means larger than 6 Mesh size.

Corresponding samples were also taken after the granules were discharged from the granulator and passed through a conventional rotating drier and cooler. The granulation on discharge from the drier has the oversize granules (+6 mesh) removed, which on removal were reduced in size by means of a roller mill and recycled. The fines and the acceptable product size granules meanwhile continued by conveyor to a rotating cooler. Samples of the granulations on discharge from the cooler were analyzed for content of fines (−20 mesh) and acceptable size granules (6 to 20 mesh). The following table shows the results of the screening, which demonstrates the diminishment of the undesirably high percent of fines obtained using the conventional granulator in contrast to the relatively low percent obtained when the granulating unit of this invention was employed.

*Table II*

| Run [1] | Percent by Weight of Granule Sizes [2] | |
|---|---|---|
| | −20 Mesh | 6 to 20 Mesh |
| A | 34.7 | 65.3 |
| B | 72.7 | 37.2 |

[1] "A" Run—the granulator of this invention employed; "B" Run—conventional granulator employed.
[2] Each value given represents an average of five samples screened.

Also, improvements were observed by employment of a double-unit granulator having a height of seven feet and a length of fourteen feet in which the two units or compartments had the following lengths: the feed end compartment about five feet; discharge end compartment, about seven feet. The drum was equipped with annular retaining rings and a dividing ring. The rings had heights of thirty inches (feed end ring), twenty inches (dividing ring), and four inches (discharge end ring). The feed-end compartment was equipped with conventional liquid feed lines and distributors.

A granular fertilizer having the analysis 14-0-14 (14% N, 0% $P_2O_5$, 14% $K_2O$) was produced both with the conventional granulator and after reconstruction in accordance with this invention.

The installations included two rotors in each compartment in a manner as shown in the figures. The rotors in the feed end compartment had the following dimensions: cleaning rotor, diameter of eight inches and a length of sixty inches; kneading rotor, diameter of fourteen inches and a length of sixty inches; ribs on the rotors, a height of one inch and extending the full length of the rotors. The rotors in the discharge end had the following dimensions: cleaning rotor, diameter of eight inches and a length of eighty-four inches; kneading rotor, a diameter of eight inches and a length of eighty-four inches; ribs on the rotors, a height of one inch and extending the full length of the rotors. In the discharge unit, longitudinal ribs of one inch in height were installed on the inner surface of the drum at intervals of about twelve inches which extended the full length of the unit. The ribs were positioned parallel to the axis of the granulator.

It was observed that essentially no caking occurred in either unit of the granulating drum when constructed according to this invention, in contrast to the considerable caking which occurred in the conventional granulator. Furthermore, a greatly more uniform and a more spherical and attractive granular product was obtained when the granulator constructed in accordance with this invention was employed.

What is claimed is:

1. A fertilizer granulating drum unit comprising in combination an open-end rotatable granulating drum, two retaining rings singly disposed at the annular ends of said granulating drum unit to prevent premature outflow of the granulating mixture, a rotor of substantially the length of said granulating drum, said rotor having radially projecting, longitudinal ribs at regularly spaced intervals, and supporting means for rotatably carrying said rotor within said granulating drum in a predetermined position whereby the axis of said rotor is maintained substantially parallel to the axis of the said granulating drum and whereby said rotor is maintainable in revolving contact with the interior surface of said granulating drum unit to provide a drum cleaning action.

2. An apparatus in accordance with claim 1 wherein said granulating drum has on its interior surface radially projecting longitudinal ribs at regularly spaced intervals.

3. An apparatus in accordance with claim 1 wherein the ribs of the rotor are from about one-half to about two inches in height.

4. A fertilizer granulating drum unit comprising in combination an open-end rotatable granulating drum, two retaining rings singly disposed at the annular ends of said granulating drum unit to prevent premature outflow of the granulating mixture, a drum-cleaning rotor of substantially the length of said granulating drum, said rotor having radially projecting, longitudinal ribs at regularly spaced intervals, a kneading rotor of substantially the length of said granulating drum, said kneading rotor having radially projecting, longitudinal ribs at regularly spaced intervals, and supporting means for rotatably carrying said drum cleaning rotor and said kneading rotor within said granulating drum in predetermined positions whereby (1) the axes of said rotors are maintained substantially parallel to the axis of said granulating drum, (2) said drum cleaning rotor is maintainable in revolving contact with the interior surface of said granulating drum to provide a drum cleaning action, and (3) said kneading rotor is maintainable in revolving contact with the granulating bed, said cleaning and kneading rotors being in spaced relationship.

5. An apparatus in accordance with claim 4 wherein said granulating drum has on its interior surface radially projecting, longitudinal ribs at regularly spaced intervals.

6. An apparatus in accordance with claim 4 wherein the ribs of the rotor are from about one-half to about two inches in height.

7. An apparatus comprising two fertilizer granulating drum units in integrated, end-to-end series, said fertilizer granulating drum series comprising in combination an open-end granulating drum, two retaining rings singly disposed at the annular ends of said granulating drum unit to prevent premature outflow of the granulating mixture, a dividing ring separating said granulating drum into two units, each of said units having a drum-cleaning rotor of substantially the length of said granulating drum, said rotor having radially projecting, longitudinal ribs at regularly spaced intervals, and supporting means for rotatably carrying said drum-cleaning rotor within said granulating drum in a predetermined position whereby (1) the axis of said drum-cleaning rotor is maintainable substantially parallel to the axis of the granulating drum, and (2) whereby said rotor is maintainable in revolving contact with the interior surface of said granulating drum unit to provide a drum cleaning action.

8. An apparatus in accordance with claim 7 wherein at least one of said granulating drum units has a kneading rotor having radially projecting, longitudinal ribs at regularly spaced intervals, and wherein the supporting means rotatably carries said drum cleaning rotor within said granulating drum in a predetermined position whereby (1) the axes of said rotors are maintained substantially parallel to the axis of said granulating drum, (2) said drum cleaning rotor is maintainable in revolving contact with the interior surface of said granulating drum to provide a drum cleaning action, and (3) said kneading rotor is maintainable in revolving contact with the granulating bed, said cleaning and kneading rotors being in spaced relationship.

9. An apparatus in accordance with claim 8 wherein at least one of said granulating units has on its interior surface radially projecting, longitudinal ribs at regularly spaced intervals.

10. An apparatus in accordance with claim 7 wherein the height of the ribs of the cleaning rotor are from about one-half to about two inches in height.

11. An apparatus comprising two fertilizer granulating drum units in integrated, end-to-end series, said fertilizer granulating drum series comprising in combination an open-end, rotatable granulating drum, two retaining rings singly disposed at the annular ends of said granulating drum unit to prevent premature outflow of the granulating mixture, a dividing ring separating said granulating drum into two units, each of said units having a drum-cleaning rotor of substantially the length of said granulating drum, said cleaning rotor having radially projecting, longitudinal ribs at regularly spaced intervals, a kneading rotor substantially the length of said granulating drum, said kneading rotor having radially projecting longitudinal ribs at regularly spaced intervals, and supporting means for rotatably carrying said drum cleaning rotor and said kneading rotor with said drum in predetermined positions whereby (1) the axes of said rotors are maintained substantially parallel to the axis of said granulating drum, (2) said drum cleaning rotor is maintainable in revolving contact with the interior surface of said granulating drum to provide a drum cleaning action and (3) said kneading rotor is maintainable in revolving contact with the granulating bed, said respective cleaning and kneading rotors being in spaced relationship.

References Cited in the file of this patent

UNITED STATES PATENTS

| | | |
|---|---|---|
| 1,042,710 | Moore | Oct. 29, 1912 |
| 1,176,040 | Doherty | Mar. 21, 1912 |
| 2,043,143 | Anderson et al. | June 2, 1936 |
| 2,720,037 | Erickson | Oct. 11, 1955 |
| 2,871,510 | Sackett | Feb. 3, 1959 |
| 2,976,125 | Buzzan | Mar. 21, 1961 |

FOREIGN PATENTS

| | | |
|---|---|---|
| 572,006 | Germany | May 16, 1931 |

UNITED STATES PATENT OFFICE
CERTIFICATE OF CORRECTION

Patent No. 3,083,081                          March 26, 1963

Joe C. Sharp et al.

It is hereby certified that error appears in the above numbered patent requiring correction and that the said Letters Patent should read as corrected below.

Column 5, line 53, for "255 pounds" read -- 225 pounds --; column 8, line 47, for "with" read -- within --.

Signed and sealed this 8th day of October 1963.

(SEAL)
Attest:

ERNEST W. SWIDER
Attesting Officer

EDWIN L. REYNOLDS

Acting Commissioner of Patents